United States Patent
Leung et al.

(10) Patent No.: US 6,985,479 B2
(45) Date of Patent: Jan. 10, 2006

(54) METHOD AND APPARATUS FOR PROCESSING INTERNET PROTOCOL TRANSMISSIONS

(75) Inventors: Nikolai K. N. Leung, Takoma Park, MD (US); Ramin Rezaiifar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 497 days.

(21) Appl. No.: 10/091,069

(22) Filed: Mar. 4, 2002

(65) Prior Publication Data

US 2003/0165121 A1    Sep. 4, 2003

(51) Int. Cl.
*H04L 12/66*    (2006.01)
(52) U.S. Cl. .................. 370/352; 370/338; 370/401; 370/356; 709/228; 709/229; 709/245; 709/221
(58) Field of Classification Search .............. 370/313, 370/312, 338, 401, 352, 356; 709/228, 229, 709/245, 221
See application file for complete search history.

(56) References Cited

U.S. PATENT DOCUMENTS

| | | | | |
|---|---|---|---|---|
| 2002/0152325 A1 * | 10/2002 | Elgebaly et al. | ............ | 709/246 |
| 2002/0154627 A1 * | 10/2002 | Abrol et al. | ................ | 370/352 |
| 2003/0007486 A1 * | 1/2003 | March et al. | ............... | 370/389 |
| 2003/0095540 A1 * | 5/2003 | Mulligan et al. | ........... | 370/352 |

* cited by examiner

*Primary Examiner*—Wellington Chin
*Assistant Examiner*—Raj Jain
(74) *Attorney, Agent, or Firm*—Philip Wadsworth; Sandra L. Godsey (57) ABSTRACT

Method and apparatus for data packet communications in a communication system. Packets are received at a gateway having an Internet Protocol (IP) destination address and Network Access Identifier (NAI). The gateway maps the received NAI to a local network, such as supported by a Network Address Translator (NAT). The gateway then converts the destination address to a NAT address of the local network. The gateway also adds a port number that allows the NAT to identify the target recipient. The mapping within the gateway is created and maintained as Mobile Stations send registration requests upon arrival within a local network. In one embodiment, the registration request is a Session Initiation Protocol (SIP) registration.

20 Claims, 8 Drawing Sheets

METHOD AND APPARATUS FOR PROCESSING INTERNET PROTOCOL TRANSMISSIONS

BACKGROUND

1. Field

The present invention relates to processing Internet Protocol (IP) transmissions in a communication system, and specifically to mapping a Network Access Identifier (NAI) to an IP address.

2. Background

With the proliferation of Internet-capable devices, both wireless and wireline devices, the number of addresses available for routing IP (Internet Protocol) transmissions is being depleted. As a result, in some regions users are no longer assigned a static IP address, but rather are dynamically assigned an IP address to accommodate the many users within a given system. The total number of IP addresses available is a function of the number of bits per address. One method for increasing the number of addresses is to increase the size of the IP address. Larger IP addresses, however, increase the loading and processing complexity of a system and increasing the address size requires a total upgrade of the entire IP network (Internet), incurring significant costs.

There is a need, therefore, for an efficient and accurate method of providing IP addresses for an ever increasing number of users, and for efficiently using the IP addresses available.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments.

With the proliferation of wireless Internet devices, there is a clear shortage in the number of globally routable IPv4 addresses. In countries outside of the U.S., namely Asia and Europe, the pool of global IPv4 addresses is almost depleted. Because of this, users often are not assigned static IP addresses and may not always be directly reached via IP protocols from the Internet. Network Address Translators (NATs) have been introduced as a means of expanding the number of IPv4 addresses in a private network; however, NATs assign private IP addresses that cannot be reached from outside the private network (i.e., they are not globally routable).

According to the exemplary embodiment, local users are assigned a global Network Access Identifier (NAI). The NAI is used as an individual address (e.g., jsmith@company.com) instead of an IPv4 address. A gateway is then used to convert a user's NAI into a local, private IP address via a translation mapping provided by the NAT. The private IP address may be used by the private network to forward the packets to the user. The exemplary embodiment may be implemented in a wireless network and applied to mobile stations without modification to a given communication standard.

As discussed hereinabove, one method for increasing available IP sessions without increasing the number of IP addresses incorporates a Network Address Translator (NAT) as an interface between a regional communication system and a local communication system. Typically in a local communication system, only a small percentage of hosts communicate outside of the local system or domain at any given time. The local domain, such as a corporate network, only handles traffic originated or destined to hosts in the domain. Many of these hosts never communicate outside of the local domain. Therefore, only a subset of the IP addresses inside a local domain need to be translated into IP addresses that are globally unique for regional communication. The NAT provides a translation to and from the local network and thus replaces the end-to-end significance of an IP address with a mapping of a global IP address to a local address. The benefit of the NAT is the increased capacity in the network.

Figure 1A:
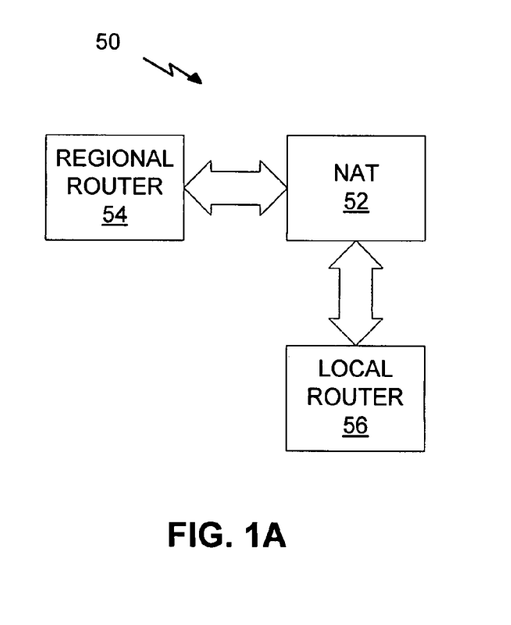
FIG. 1A is a diagram of a Network Address Translator (NAT) in an Internet Protocol (IP) communication system.

The NAT is a router function that may be configured as shown in FIG. 1A. The NAT allows addresses within a local domain to be reused by any other disjoint local domain. For instance, a single address could be used by many local domains. At each exit point between a local domain and regional network, a NAT is installed. If there is more than one exit point, each NAT will have the same translation table. The translation table maps an IP address used in the regional network to a local IP address. The concepts and specifications of a NAT router is detailed in "The IP Network Address Translator (NAT)" by K. Egevang, et al., IETF RFC 3022, January 2001, which is hereby expressly incorporated by reference.

The NAT effectively allows the routing of a "fake" IP network over a "real" one. The real IP network is typically the Internet or a system supporting an Internet Protocol (IP), whereas a fake IP network refers to a local network. The NAT allows a single IP address connection to multiple users. The NAT serves as the interface between the fake IP network and the real network.

FIG. 1A illustrates a communication system 50 having a Network Address Translator (NAT) 52 in communication with a local router 54 and a regional router 56. The NAT 52 functions as described hereinabove, providing an interface between a regional network supported by the regional router 54 and the local network supported by the local router 56.

Figure 1B:
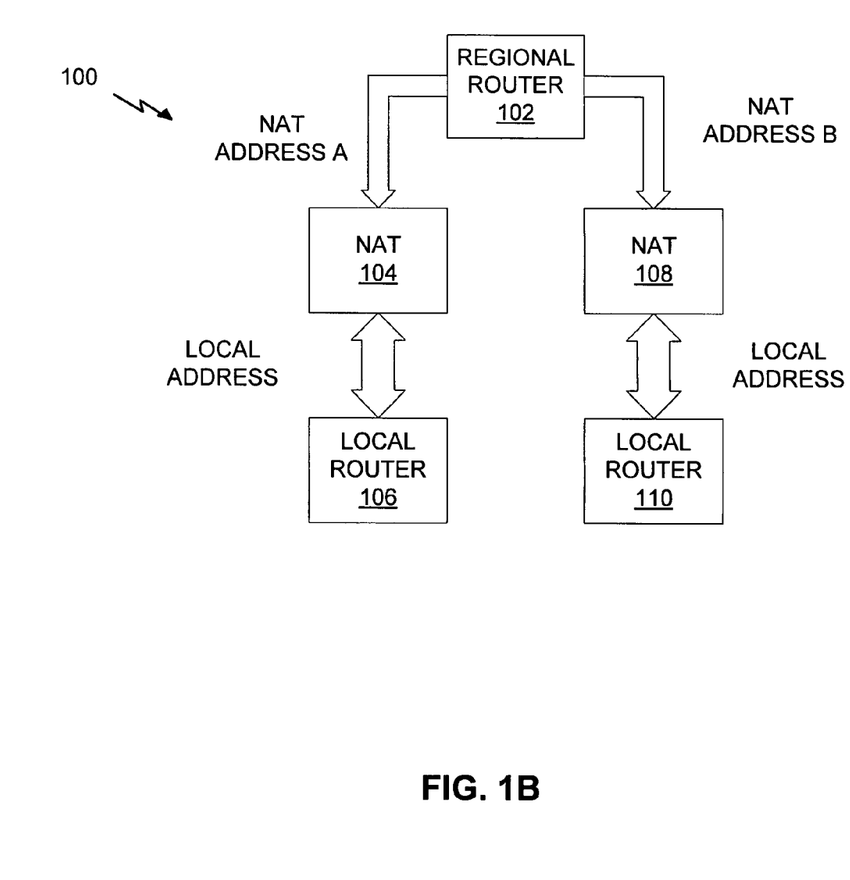
FIG. 1B is a diagram of multiple Network Address Translators in an Internet communication system.

FIG. 1B illustrates a similar communication system 100 having a regional router 102 in communication with two NATs, NAT 104 and NAT 108. The NAT 104 has an associated IP address A, and the NAT 108 has an associated IP address B. The addresses A and B are used in the regional network and are known by the regional router 102 to address NAT 104 and NAT 108, respectively. The NAT 104 is the interface to the local network A (not shown) supported by local router 106. The NAT 104 includes a translation mapping to locally unique addresses used in the local network A. Note that the addresses used within local network A are not globally unique and may be used by other local networks.

The NAT 108 is the interface to the local network B (not shown) supported by local router 110. The NAT 108 includes a translation mapping to locally unique addresses used in the local network B. Note that the addresses used within local network B are not globally unique and may be used by other local networks.

In operation, a user in the local network, such as local network A, sends a packet to the regional network through the local router 106 to the NAT 104. The NAT 104 interface translates the user address in local network A into a global IP address. The NAT 104 also translates the source port number to a unique port number. To the regional network, all packets from NAT 104 appear to be from one user, when in fact, any number of users may be included in the local network A. When regional network sends a packet to the local network A, the packet is addressed to the global IP address. The NAT 104 interface translates the global IP address into a local address and routes the packet to the appropriate user and/or device on the local network A. As a protection to the local network A, if the packet is not in response to a request from the local network, or it is not a packet destined for a predetermined service or IP address, the NAT 104 interface drops the packet and does not pass it to the local network. Operation with respect to local network B, local router 110, and NAT 108 is similar.

Figure 2:
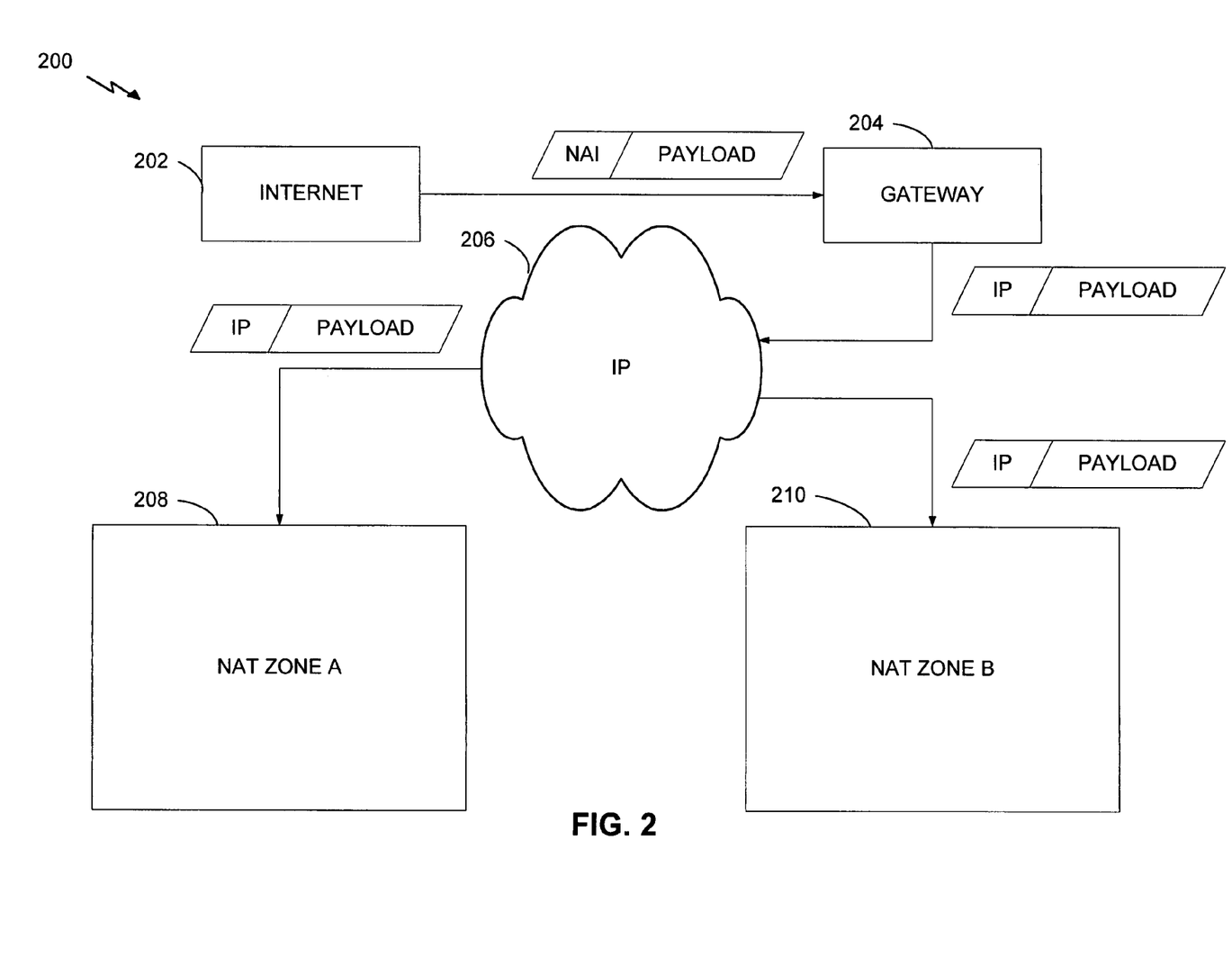
FIG. 2 is a communication system supporting Internet Protocol transmissions.

FIG. 2 illustrates a communication system 200 supporting IP communications. A gateway 204, such as a PUSH gateway, is coupled to a packet source, such as the Internet 202. Information is sent from the Internet 202 to gateway 204 in packets. Each packet includes payload information and NAI information corresponding to the target recipient. Each packet also has an associated IP header to assist the Internet to deliver the packet initially to the gateway (i.e., the packet with the NAI has the gateway IP address as its destination IP address). The format of the packets as they traverse the system 200 are illustrated by way of datagram overlays to the system 200 diagram. As described hereinabove, the NAI provides a common, unique address identifier for the target recipient. The NAI is intended to uniquely identify the target recipient, which in a mobile IP situation is typically a mobile user, i.e., mobile node. The gateway 204 receives the packet and extracts the NAI information. The gateway 204 then redirects the packet within the system. The gateway 204 effectively converts the NAI into a local, private IP address via a translation mapping, wherein the translation mapping was assigned by the destination NAT and provided by a registration message prior to the communication. The gateway 204 communicates with other resources within system 200 using a Session Initiation Protocol (SIP) discussed hereinbelow. Note that at this point, the packet may or may not include the NAI information. Since the NAT IP address and the port number corresponding to the user are already included in the packet, the user will receive the packet.

The gateway 204 is coupled to an IP network or cloud 206, which is further coupled to NAT zone A 208 and NAT zone B 210. The IP cloud 206 may be any network that is capable of processing packetized data, and specifically, packets having an IP format. When packets are sent from the gateway to the NAT zones, the IP address of the appropriate NAT is included as the destination address.

In a communication system having an interface with an Internet Protocol (IP) type network, specific signaling protocols are commonly used to address initiation, termination, and other issues involved in a communication. One such protocol is the Session Initiation Protocol or SIP. SIP is a signaling protocol used for Internet conferencing, telephony, presence, events notification and instant messaging, as well as many other Internet applications. SIP was developed within the IETF MMUSIC (Multiparty Multimedia Session Control) working group, with work proceeding since September 1999 in the IETF SIP working group; SIP is described in RFC 2543 entitled "SIP: Session Initiation Protocol," which is hereby expressly incorporated by reference.

The Session Initiation Protocol (SIP) is an application-layer control (signaling) protocol for creating, modifying and terminating sessions with one or more participants. These sessions may include, but are not limited to: Internet multimedia conferences, Internet telephone calls and multimedia distribution. Members in a session can communicate via multicast or via a mesh of unicast relations, or a combination thereof. The SIP specifies the signaling used to initiate, maintain and terminate a session, such as a Point-to-Point Protocol (PPP) session.

SIP may be used to establish, modify and terminate multimedia sessions or calls. Multimedia sessions may include multimedia conferences, distance learning, Internet telephony and similar applications. SIP may be used to invite both persons and devices, such as a media storage service, etc., to both unicast and multicast sessions, wherein the initiator may send invitations to a session to which it is not a part of. SIP may be used to initiate sessions as well as invite members to sessions that have been advertised and established by other means. Sessions may be advertised using multicast protocols such as Session Announcement Protocol (SAP), electronic mail, news groups, web pages or directories, among others. The SIP transparently supports name mapping and redirection services, allowing the implementation of Integrated Services Digital Network (ISDN) and Intelligent Network telephony subscriber services. These facilities also enable personal mobility. In the parlance of telecommunications intelligent network services, personal mobility is the ability of end users to originate and receive calls and access subscribed telecommunication services on any terminal in any location, and the ability of the network to identify end users as they move. Personal mobility is based on the use of a unique personal identity (i.e., personal number).

Initially, when a Mobile Station (MS) or other mobile device (not shown) is assigned a private/local IP address in a NAT zone, the MS registers with a gateway using SIP registration procedures. The gateway 204 may be a "PUSH" gateway. The term PUSH implies that the gateway allows applications on the Internet to push traffic to the user, without requiring the user to make a request for the information. Similarly, a user request for information from the Internet is referred to as a "PULL." The registration message from the MS passes through the NAT to the IP network 206, wherein the payload includes the registration message; the message sent from the MS is a SIP registration message. The SIP registration message includes NAI specific to the MS. The packet is forwarded from the IP network 206 to the PUSH gateway 204. The same SIP registration message is included, however, the source IP address and port is changed by the NAT. The PUSH gateway 204 extracts the NAI information from the packet and records the NAI. The gateway 204 also extracts and records the translated source address and port number of the message (i.e., IP address of NAT and the translated port number for the user's private IP address). Note that the translated IP source address and port number are in the TCP or UDP header. The PUSH gateway 204 generates and maintains a mapping of NAI to NAT IP address and port number. In this way, on receipt of an incoming message from the Internet that contains the NAI of the MS, the gateway 204 is able to direct messages to the NAI associated with the target recipient. The PUSH gateway 104 translates the destination IP address and port number corresponding to the NAI information. The packet is then forwarded to the appropriate NAT via standard IP routing procedures. Upon receipt of the packet, the NAT performs standard network address translation to direct the packet to a private IP address associated with the MS. When the message is received at the MS, the MS may use this message to start a session, including a PULL-type of session such as HTTP, SMTP, FTP, etc., responsive to the message content.

For wireless mobility, the MS re-registers with the PUSH gateway 204 whenever it roams into a different NAT zone. In each zone, the MS is assigned a private IP address, which will be translated into a distinct NAT IP address and port number when the MS registers with the PUSH gateway 204. When the PUSH gateway 204 receives a new registration for an MS having an active NAI mapping, i.e., MS already has an existing record of a mapping between the NAI and a NAT address & port number, the PUSH gateway 204 replaces the existing mapping with the new NAT address and port number specified in the new registration.

Figure 3:
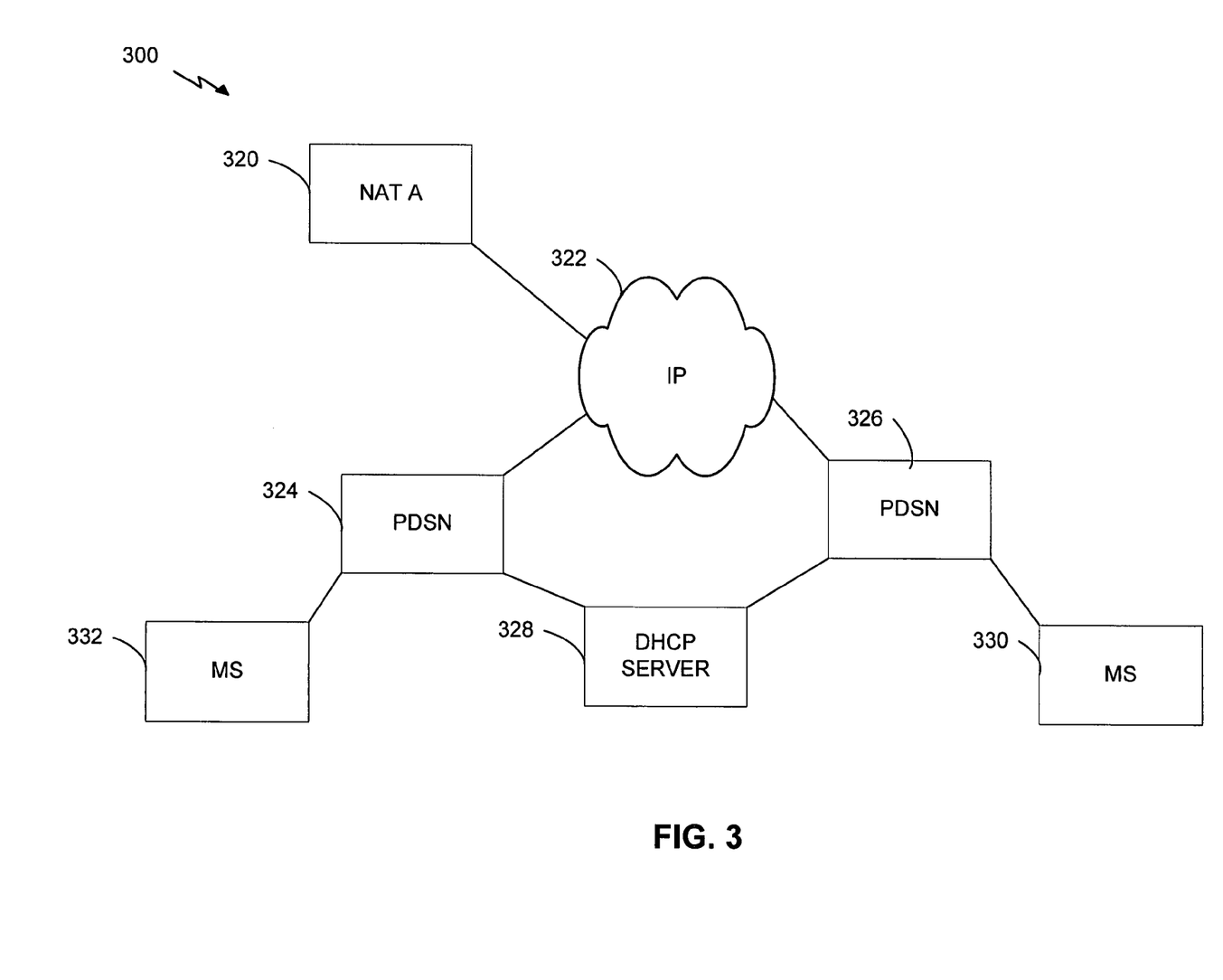
FIG. 3 is a zone within a communication system supporting Internet Protocol transmissions.

FIG. 3 illustrates the configuration of a wireless communication system 300, wherein a NAT zone, NAT A 320 is coupled to an IP cloud 322. The IP cloud 322 is then coupled to various local networks through Packet Data Service Node(s) (PDSNs). Two PDSNs are illustrated as an example, PDSN 324 and PDSN 326. Note that both PDSN 324 and PDSN 326 are each coupled to DHCP server 328. The PDSN 324 serves MS 332, while the PDSN 326 serves MS 330. Initially, when an MS enters a PDSN service area, the MS registers. In the exemplary embodiment, MS 332 and 330 register with the gateway 204. The registration is actually directed to the gateway but passes through the PDSN & NAT using an SIP registration process. The SIP registration includes a local IP address as the source of the communication and also includes an NAI. The SIP registration is sent through the PDSN, and from there the registration message is provided to NAT A 320 via the IP cloud 322. The NAT A 320 changes the source address of the SIP registration message to a global IP address associated with the NAT A 320, plus a port number corresponding to the sending MS. Note that the PDSNs are not disjoint, and they share the same private IP address space.

Figure 4:
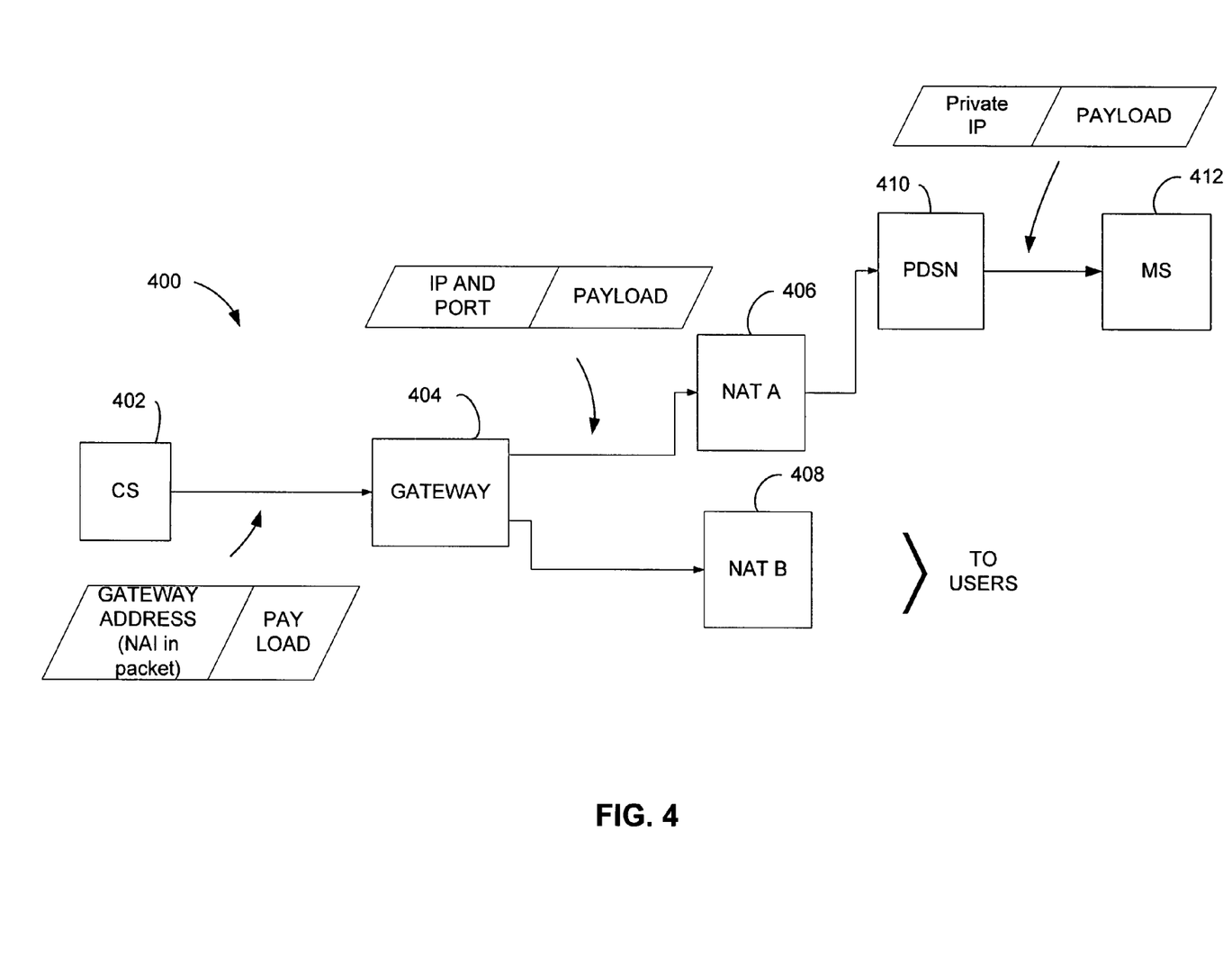
FIG. 4 is a diagram of a message flow for an Internet Protocol transmission in a communication system topology.

FIG. 4 illustrates the processing of packet data through a communication system 400, including multiple local networks similar to system 300 of FIG. 3. As illustrated a Content Server (CS) 402 provides packets of data to the gateway 404. The packet destination is the gateway address. The packet also includes the NAI of the MS. The gateway 404 then applies an IP address and a port number, wherein the IP address identifies the NAT zone of the target recipient, and the port number identifies the user within that NAT zone. The gateway 404 may send packets to multiple NAT zones, such as NAT A, B 406, 408. Within each NAT zone, packets are processed through a PDSN to the MS. As illustrated a packet of data is transmitted to NAT A 406 and then to MS 412 via PDSN 410. The PDSN 410 routes the packet using the private IP address of MS 412. The number of users that can be served is limited by the number of private IP addresses that can be assigned under each NAT zone 406 and 408.

Figure 5:
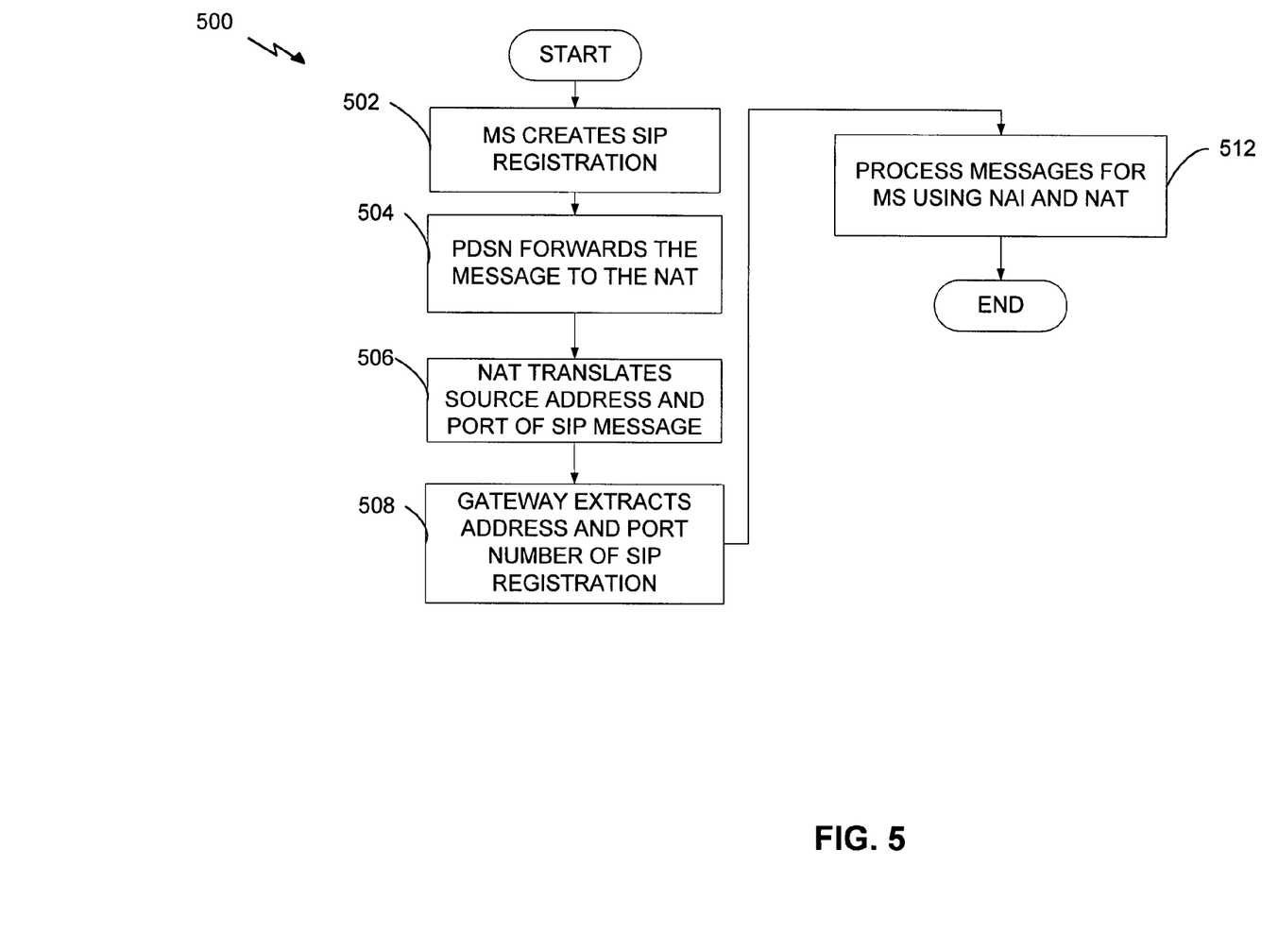
FIG. 5 is a flow diagram for a message flow for an Internet Protocol transmission in a communication system topology.

FIG. 5 illustrates a method 500 for processing packets in an IP communication system 400 of FIG. 4. At step 502, when the MS 412 has been assigned a private IP address by the local PDSN 410, the MS creates an SIP registration request and sends the registration request to the gateway 404, through the local PDSN 410. The registration request identifies the source address and the NAI of MS 412. The PDSN simply forwards the SIP message on through the NAT A (step 504). NAT A does the translation, and forwards the message onto the gateway (step 506). The gateway 404 then extracts and records the source address and port number of the SIP registration at step 508. Since the SIP registration message from the MS is meant to register the MS with the gateway, the SIP registration message terminates at the gateway.

After registration is complete, the system is prepared to deliver PUSH traffic to the MS. When the CS sends packets to the MS, it directs the packets to the gateway 404 and includes the MS specific NAI. At step 512, the system processes these incoming packets based on the NAI and the MS local NAT mapping. The gateway 404 uses the MS NAI to direct the packets to the corresponding NAT address and port number of the MS. Within NAT A 406 the local routing to MS 412 is performed. The NAT A 406 uses the port number to identify the MS 412 among all the users supported in the zone.

Figure 6:
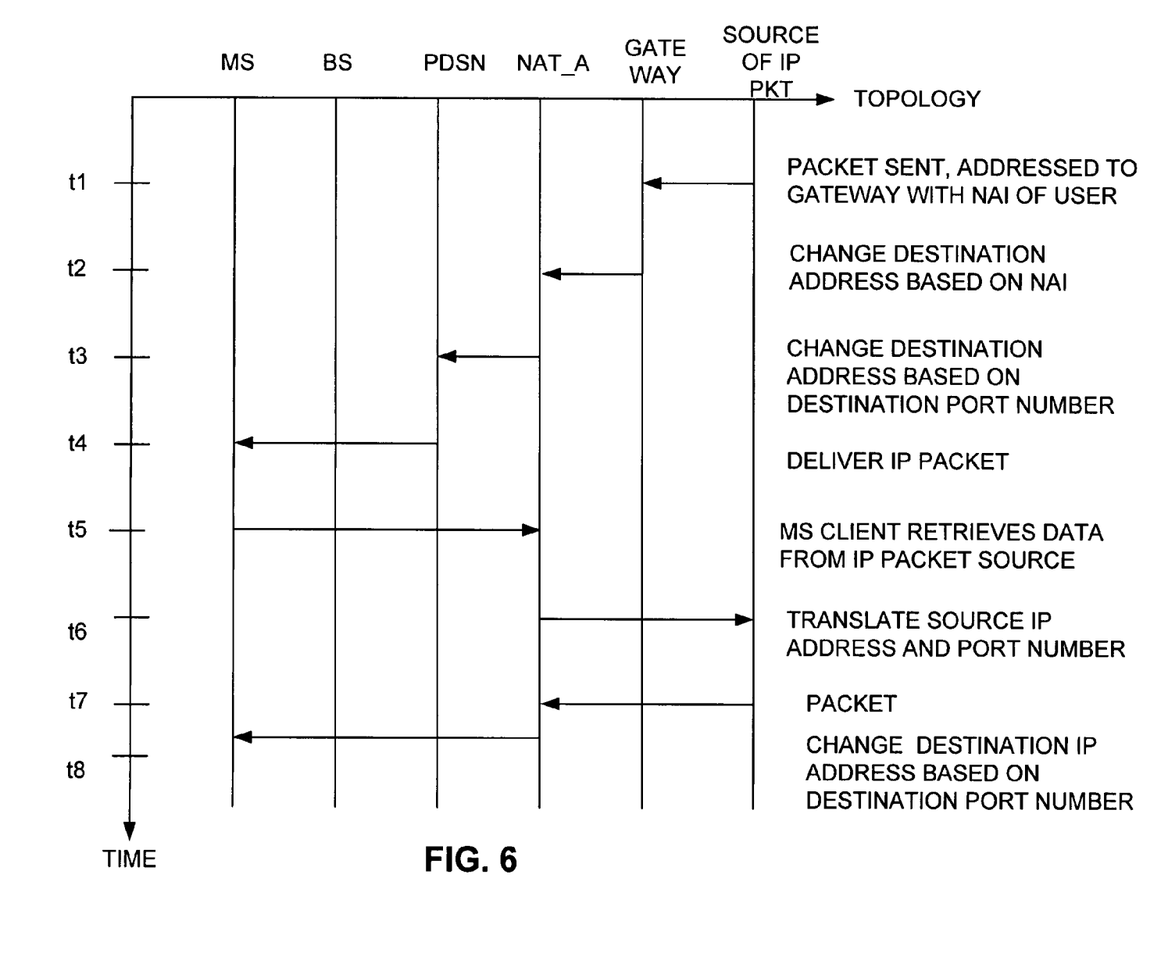
FIGS. 6 and 7 are diagrams of processing IP transmissions in a communication system.

FIG. 6 illustrates a timing scenario associated with the processing of packets in a communication system. The vertical axis represents time, while the horizontal axis identifies elements and components of the system. At time t1, the packet is sent from an IP source, such as the Internet, to the gateway. The packet is addressed to the gateway and includes the NAI of the target recipient. At time t2, the gateway changes the destination address and port number based on the NAI information. The packet is then forwarded to the NAT zone, NAT_A. At time t3, the NAT_A changes the destination address based on the destination port number and forwards the packet to the PDSN. The PDSN then delivers the packet to the target recipient at time t4.

The MS may also initiate a packet transfer, as illustrated from time t5, wherein the MS client desires to retrieve data from the Internet, or other IP packet source. The MS client sends a request through NAT_A, wherein the MS client is identified as the source. The NAT_A translates the source address into the NAT_A IP address and the port number assigned to the MS by the NAT_A at time t6. The packet is then sent from the Internet, or other IP packet source, at time t7. On receiving the requested packet, the NAT_A changes the destination IP address, i.e., NAT IP address, based on the destination port number at time t8 and delivers the packet to the MS.

Figure 7:
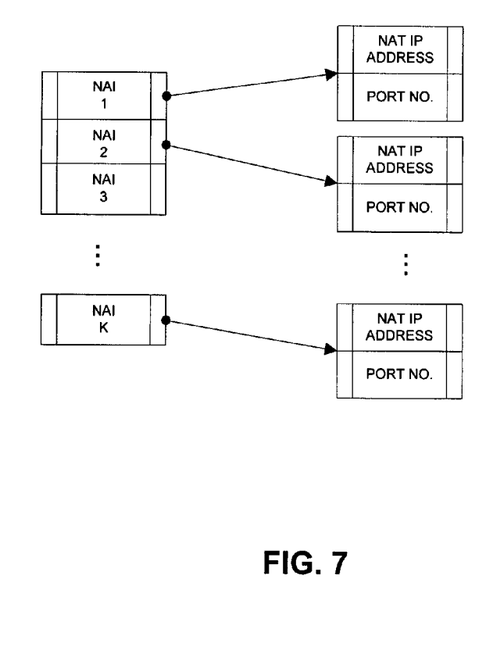

The mapping recorded at the gateway is illustrated in FIG. 7 according to one embodiment. Each NAI entry 1, 2, 3, . . . , K is mapped to a corresponding combination of NAT IP address and port number. This mapping serves to fully identify a target recipient without incurring the use of a unique globally routable IP address for each potential recipient. This mapping will change on occurrence of a user handoff to a new NAT zone. Since the number of private IP addresses that can be used is large, the NAT zones can be made large. This can reduce the number of times an MS moves between zones. For example, a NAT zone might cover a city of 15 million subscribers. In this case, mobility within the city will not require re-registration.

As described with respect to the embodiments detailed hereinabove, when an MS is assigned a local network IP address, i.e., a private IP address, the MS registers with a gateway. The local network is part of a NAT zone, wherein within the local network each user is identified by a private IP address. Outside the local network, all users in the local network are identified by the IP address of the NAT and the corresponding port numbers. Each MS registers with a gateway using SIP registration procedures. The registration request includes the NAI of the MS. The registration message passes through the NAT (of the zone) and is forwarded to the gateway, typically via an IP cloud. The gateway records the NAI included in SIP registration message and the translated source address and port number of the registration message source. The gateway thus records the NAT IP address, and the port number of the user's private IP address. The gateway maintains the mapping of NAI to NAT IP address and port number. Upon receipt of SIP messages from the Internet addressed to an NAI, the gateway translates the destination IP address and port number accordingly.

The gateway records the mapping of the users NAI to the NAT IP address and port number. The use of the NAI increases the available identifiers, as the NAI is globally unique and has significant more combinations for use than those defined in IPv4.

Figure 8:
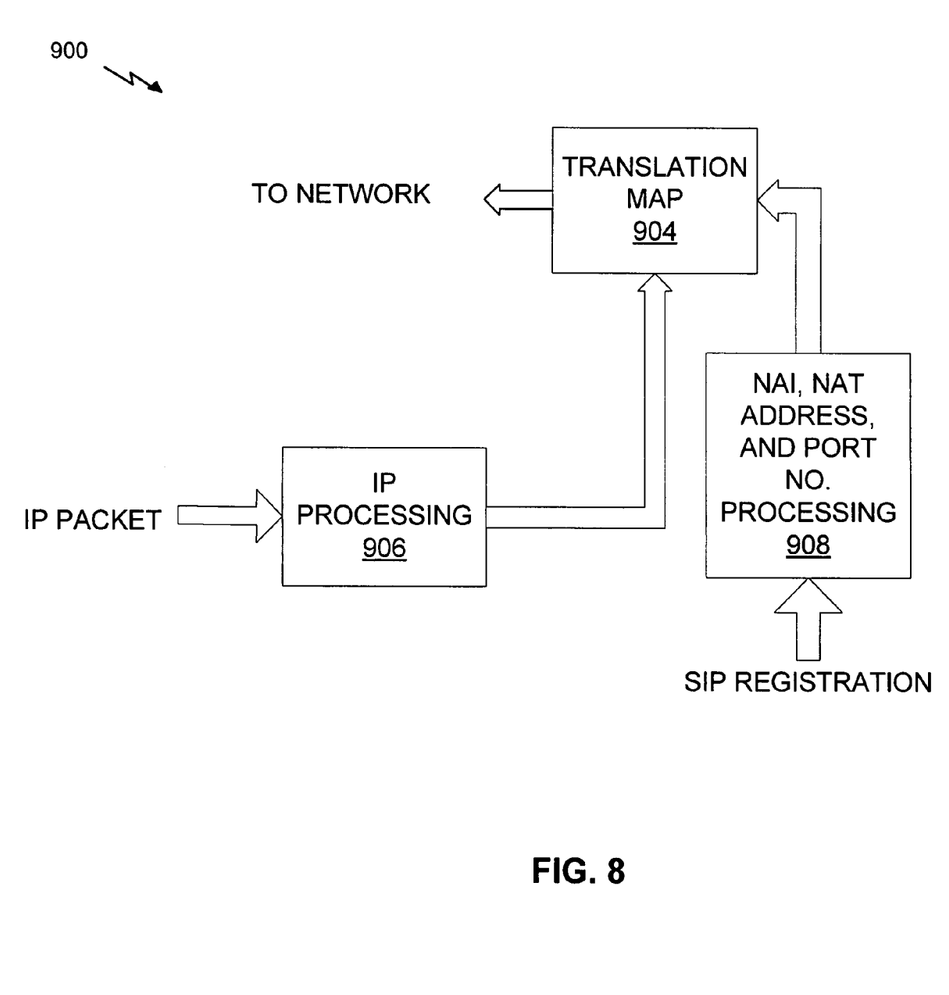
FIG. 8 is a gateway in an IP communication system.

FIG. 8 illustrates a portion of a gateway, such as gateway 204 of FIG. 2 for processing IP packets received from the Internet. Each time an MS moves to a new NAT zone, the MS sends an SIP registration to the NAI, NAT address and port number processing unit 908, which extracts the NAI information, NAT address and port number information and stores this information as a connected pair in the translation map 904. The translation map 904 may be as illustrated in FIG. 7. The translation map 904 includes multiple mappings of potential target recipients.

Continuing with FIG. 8, IP packets are received and processed in IP processing unit 906, wherein the payload information and the destination information are received. The destination information is extracted from the IP packet to determine the NAI of the target recipient. The NAI information is provided to the translation map 904 to determine the NAT address and port number associated with the target recipient, identified by the NAI.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM (read access memory) memory, flash memory, ROM (read only memory) memory, EPROM (erasable programmable electrical memory) memory, EEPROM (electrical erasable programmable memory) memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system supporting Internet Protocol (IP) communications, a method comprising:
   receiving an IP packet having a destination IP address and a Network Access Identifier (NAI);
   determining a Network Address Translator (NAT) corresponding to the NAI;
   determining a port number associated with the NAT and the NAI, the NAT having an NAT IP address;
   converting the destination IP address and the NAI to the NAT IP address and the port number; and
   directing the IP packet to the NAT IP address.

2. The method as in claim 1, further comprising:
   receiving a Session Initiation Protocol (SIP) registration from a mobile station;
   processing IP packets for the mobile station through the gateway using NAT and NAI.

3. A wireless communication apparatus supporting Internet Protocol (IP) communications, comprising:
   means for receiving an IP packet having a destination IP address and a Network Access Identifier (NAI);
   means for determining a Network Address Translator (NAT) corresponding to the NAI;
   means for determining a port number associated with the NAT and the NAI, the NAT having an NAT IP address;
   means for converting the destination IP address and the NAI to the NAT IP address and the port number; and
   means for directing the IP packet to the NAT IP address.

4. A gateway in a wireless communication system supporting Internet Protocol (IP) communications, comprising:

Network Access Identifier (NAI) processing unit, adapted to identify a first mobile station by a NAI associated with the first mobile station; and translation map coupled to the NAI processing unit, adapted to store a mapping of the NAI to a Network Address Translator (NAT) and a port number to identify the first mobile station.

5. The gateway as in claim 4, further comprising:

IP packet processing unit coupled to the translation map, providing IP packets to the translation map, wherein the mapping stored in the translation map is applied to address the first mobile station.

6. The gateway as in claim 4, wherein the gateway is a PUSH gateway.

7. The gateway as in claim 4, wherein the NAI processing unit receives a Session Initiation Protocol (SIP) registration message from the first mobile station, and in response determines the mapping of the NAI to the NAT and port number.

8. The gateway as in claim 7, wherein the translation map stores an updated mapping when the first mobile station moves to a different NAT and sends an SIP registration.

9. The gateway as in claim 4, wherein the translation map is further adapted to provide addressing to the first mobile station.

10. The gateway as in claim 8, wherein the gateway changes a destination address for the first mobile station based on the port number.

11. The gateway as in claim 4, wherein the first mobile station is located within the NAT.

12. The gateway as in claim 11, wherein the first mobile station is identified with the NAT by the port number.

13. The gateway as in claim 4, wherein the NAI is an Ipv4 address.

14. The gateway as in claim 4, wherein the translation map comprises a memory storage device.

15. An apparatus in a wireless communication system supporting Internet Protocol (IP) communications, comprising:

means for identifying a first user based on a Network Access Identifier (NAI); and means for mapping the NAI of the first user to a Network Address Translator (NAT) within which the first user is located, and a port number within the NAT that identifies the first user.

16. The apparatus as in claim 15, further comprising:

means for addressing packets to the first user based on the NAT and the port number.

17. In a wireless communication system supporting Internet Protocol (IP) communications, a method for communicating an IP packet to a target recipient, the method comprising:

forming a destination address for the IP packet to the target recipient, the target recipient within a Network Address Translator (NAT) zone, the NAT zone served by a gateway, the address comprising a Network Access Identifier (NAI) of the target recipient and a gateway identifier of a gateway on a transmission path to the target recipient; and translating the destination address to an updated destination address comprising an IP address of the NAT and a port number of the target recipient.

18. The system as in claim 17, wherein the destination address is used to transmit the IP packet to the gateway.

19. The system as in claim 18, wherein the updated destination address is used to transmit the IP packet from the gateway to the NAT zone.

20. The system as in claim 17, further comprising:

storing in the gateway a mapping of the NAI to the NAT and the port number.

* * * * *